United States Patent
Chen et al.

(10) Patent No.: US 9,936,716 B2
(45) Date of Patent: Apr. 10, 2018

(54) PHYSICAL METHOD FOR MAINTAINING FRESHNESS OF VEGETABLES AND FRUITS VIA TECHNOLOGY OF OPTICAL SIGNAL AND OPTICAL SIGNAL GENERATOR

(71) Applicants: Jing Li Chen, Guangdong (CN); Yu Chen, Guangdong (CN)

(72) Inventors: Jing Li Chen, Guangdong (CN); Yu Chen, Guangdong (CN)

(*) Notice: Subject to any disclaimer, the term of this patent is extended or adjusted under 35 U.S.C. 154(b) by 0 days.

(21) Appl. No.: 14/944,699

(22) Filed: Nov. 18, 2015

(65) Prior Publication Data

US 2016/0143116 A1    May 19, 2016

Related U.S. Application Data

(62) Division of application No. 13/982,218, filed on Dec. 23, 2013, now Pat. No. 9,210,944.

(51) Int. Cl.
*A23B 7/01* (2006.01)
*A23B 7/015* (2006.01)
(Continued)

(52) U.S. Cl.
CPC ............ *A23B 7/015* (2013.01); *A23B 7/04* (2013.01); *H05B 37/029* (2013.01); *A23L 3/26* (2013.01); *H05B 33/0857* (2013.01)

(58) Field of Classification Search
CPC .. A01G 9/20; A01G 7/06; A23B 7/015; A23B 7/01; A23L 3/26
(Continued)

(56) References Cited

U.S. PATENT DOCUMENTS

| 4,871,559 A | 10/1989 | Dunn et al. |
| 7,685,934 B2* | 3/2010 | Min ............ A23L 3/005 99/451 |

(Continued)

FOREIGN PATENT DOCUMENTS

| CN | 2519219 Y | 10/2002 |
| CN | 1740707 A | 3/2006 |

(Continued)

OTHER PUBLICATIONS

International Search Report dated Jul. 7, 2011 for Chinese Application No. PCT/CN2011/071554.

*Primary Examiner* — Reginald L Alexander
(74) *Attorney, Agent, or Firm* — Sheppard Mullin Richter & Hampton LLP (57) ABSTRACT

A physical method for maintaining the freshness of vegetables and fruits via the technology of the optical signal and optical signal generator are disclosed. By adopting the computer programmable pulsed scanning signal generator, it controls the light-emitting device mounted with red, green and blue light sources group to generate optical signal with pulsed or pulsed periodical scanning combined spectrum. The optical signal irradiates the fresh-cut fruits and vegetables preserved in the storage assembly at room temperature or at controlled temperature and humidity. By regulating the optical signal with periodical pulsed spectrum or pulsed scanning spectrum or periodical pulsed scanning combined spectrum, the irradiated vegetables and fruits obtain photon energy needed in light reactions of photosynthesis from the lighting environment of artificial optical signal which is in bright and dark periodic variation. The metabolism of the cellular tissue is recovered and maintained, and the growth inertia is kept at slow speed. It effectively prolongs the freshness state of vegetables and fruits which are preserved in the storage assembly.

7 Claims, 6 Drawing Sheets

(51) Int. Cl.
  *H05B 37/02*  (2006.01)
  *A23B 7/04*  (2006.01)
  *A23L 3/26*  (2006.01)
  *H05B 33/08*  (2006.01)

(58) Field of Classification Search
  USPC .................................. 99/467, 468; 426/248
  See application file for complete search history.

(56) References Cited

U.S. PATENT DOCUMENTS

| | | | |
|---|---|---|---|
| 7,764,028 | B2* | 7/2010 | Mariyama .......... H05B 33/0815 |
| | | | 315/246 |
| 8,074,397 | B2 | 12/2011 | Yoneda et al. |
| 2009/0280223 | A1 | 11/2009 | Scott |
| 2010/0170278 | A1 | 7/2010 | Min et al. |
| 2010/0287830 | A1 | 11/2010 | Chen et al. |
| 2011/0209400 | A1 | 9/2011 | Rooymans |
| 2011/0209404 | A1 | 9/2011 | Scott |
| 2013/0337121 | A1* | 12/2013 | Sugano ................. A23B 4/015 |
| | | | 426/232 |
| 2014/0060104 | A1* | 3/2014 | Shur ....................... A61L 2/10 |
| | | | 62/264 |

FOREIGN PATENT DOCUMENTS

| | | |
|---|---|---|
| CN | 101086419 A | 12/2007 |
| CN | 101257750 A | 9/2008 |
| CN | 201273757 Y | 7/2009 |
| CN | 201277791 Y | 7/2009 |
| JP | H11159953 A | 6/1999 |
| WO | WO 2007/068645 A1 | 6/2007 |

* cited by examiner

PHYSICAL METHOD FOR MAINTAINING FRESHNESS OF VEGETABLES AND FRUITS VIA TECHNOLOGY OF OPTICAL SIGNAL AND OPTICAL SIGNAL GENERATOR

CROSS REFERENCE TO RELATED APPLICATIONS

This application is a division of U.S. application Ser. No. 13/982,218, filed Dec. 23, 2013, which is a U.S. National Stage Application under 35 U.S.C. § 371 of International Application No. PCT/CN2011/071554, filed Mar. 7, 2011, which claims priority to Chinese Application No. 201110041210.1 filed Jan. 28, 2011, the content of each of which is incorporated by reference in its entirety.

FIELD OF THE INVENTION

The present invention relates to a physical method using optical signal and an optical signal generator and, in particular, to a physical method for maintaining freshness of vegetables and fruits via technology of optical signal and an optical signal generator.

BACKGROUND OF THE INVENTION

Manufacture and maintaining freshness of the agricultural products is a continuous procedure of the agricultural production which is considered to "secondary industry" during the agricultural reproduction. The preservation, manufacture and maintaining the freshness of the agricultural product after the agricultural production are attached primary importance to the agriculture all over the world. The vegetables and fruits are fresh foods and easily become putrid. In order to extend the duration of freshness, one form of maintaining freshness of the vegetables and fruits is cold storage which can preserve the vegetables and fruits for a long time to keep the anniversary of the supply, even if the environmental temperature is high. Cold storage can reduce the respiratory rate and the rot rate of the vegetables and fruits, and incidence of the Pathogenic bacteria, to prevent the tissue from wane and extend the duration of freshness. There are many methods for maintaining the freshness with high energy consumption which can create a lower temperature circumstance than the freezing point of the tissue of the vegetables and fruits. However, the cold storage technology is of high electric energy consumption, and the foods are unacceptable for consumers due to the unsuitable storage temperature for the foods. The key to prevent the vegetables and fruits from cold-injury or cool-damage are, for example, to keep the storage temperature suitable depending on the nature of particular vegetables and fruits, to gradually reduce the temperature for avoiding the cold-injury, and so on. Therefore, there is a need to improve the cold storage technology which can consume lower energy and prevent the vegetables and fruits from cold-injury or cool-damage during the period of preservation. At present, the fact should be explored that in the condition of room temperature, fruits and vegetables are maintained a slow growth through optical signal. The optical signal technology physical methods for fruits and vegetables preservation have not been reported.

SUMMARY OF THE INVENTION

The present invention provides a physical method for maintaining freshness of vegetables and fruits via technology of optical signal and optical signal generator which can make the vegetables and fruits slowly grow under the irradiating of the optical signal, prevent them from cold-injury or cool-damage, and extend the duration of the freshness.

One aspect of the present invention relates to a physical method for maintaining freshness of the vegetables and fruits by optical signal technology. The physical method comprises the steps of: controlling a optical signal generator with red, green and blue light sources using a computer programmable pulsed scanning signal generator to generate an optical signal with pulsed or pulsed periodical scanning combined spectrum, and irradiating the vegetables and fruits with optical signal to make them grow slowly such that the duration of the freshness is extended when they are preserved in the storage assembly at room temperature or at controlled temperature and humidity.

The strengthen of the optical signal with combined spectrum and its pulsation period are adjustable, and the combined form of the red, green and blue light sources with pulsed scanning signal and its scanning cycle are adjustable. The irradiated vegetables and fruits obtain photon energy needed in light reactions of photosynthesis from the lighting environment of artificial optical signal which is in bright and dark periodic variation, such that the metabolism of the cellular tissue is thus recovered and maintained, and the growth inertia is kept at slow speed.

Another aspect of the present invention relates to an optical signal generator for maintaining freshness of the vegetables and fruits, comprising a main frame, an enclosure, a door, and a receiving device for vegetables and fruits. The optical signal generator further comprises a lighting plate structure composed of a red light source lighting plate, a green light source lighting plate and a blue light source lighting plate jointed together, a computer programmable pulsed scanning signal generator, a red light source ICA controller, a green light source ICA controller, a blue light source ICA controller, a red light source group, a green light source group, and a blue light source group, wherein a pulse generated by the computer programmable pulsed scanning signal generator periodically scans the combined signal and controls connection and disconnection of the red light source ICA controller, the green light source ICA controller, the blue light source ICA controller so as to control the corresponding lighting of the red light source group, the green light source group, and the blue light source group, and emit light signal with pulsed or pulsed periodical scanning combined spectrum.

The optical signal generator can be made in form of cabinet structure, and the lighting plate structure is mounted inside the main frame and the enclosure. A transparent isolation fence or a transparent isolation glass-plate with protective effect is mounted on the surface of the lighting plate structure. A fan and an air duct are mounted inside the enclosure. A wind hole is disposed under the enclosure. An automatic humidifying system and a humidifying tube interface are mounted one side of the enclosure.

The optical signal generator can be made in form of cabinet structure having channels, and the lighting plate structure is mounted inside the main frame made in form of adjustable supporting rod in vertical direction and the enclosure. A fan and an air duct are mounted inside the enclosure, and an automatic humidifying system and a humidifying tube interface are mounted above the enclosure, the automatic humidifying system being communication with a water inlet tube. The lighting plate structure is composed of multiple sets of the red light source group, the green light source group, and the blue light source group which are arranged alternatively, wherein the red light source group, the green light source group, and the blue light source group comprises single-linear or multi-linear lighting tubes, single-point or multi-point lighting lamps, or single-point or multi-point LED, or light emitter made of rare earth material with lower energy consumption. The red light source group, the green light source group, and the blue light source group are arranged in parallel and apart from each other. The red light source group, the green light source group, and the blue light source group are arranged on different concentric circles. The red light source group, the green light source group, and the blue light source group are arranged radially.

The present invention is based on the principles of:

metabolism of the cellular tissue and the photosynthesis of the plants; in the present invention, the optical signal with pulsed or pulsed periodical scanning combined spectrum can provide lower luminance (ranging from 10-1000 lux equal to or smaller than equivalent solar light of 1%), and the level of energy of the light quantum of pulsed optical signal is higher than that of optical signal with continuous spectrum so as to reduce the speed of the metabolism;

(b) the polysaccharide transformed from monosaccharide during the light reaction and dark reaction of the metabolism of the plant being stored in plant, and the cycle frequency of the light and dark reaction is accelerated to improve the gross amounts of the monosaccharide and the polysaccharide;

(c) reducing the speed of the metabolism of the vegetables and fruits by irradiating them during alternation of the light and dark; the tissue cells within the body can obtain the energy of the light quantum and absorb water molecule to recovery the surface tension and thus ethylene gas can not accumulate in the body; additionally, the ultraviolet spectral component with high frequency has better effect than the continuous ultraviolet ray;

(d) at a temperature of 5~35° C., a humidity greater than 65% and a luminance of 40-1000 Lux equal to or smaller than equivalent solar light of 1%, keeping the metabolism process and absorbing water molecule to reduce the speed of the metabolism and prevent the anaerobic respiration from occurring; excreting the harmful substances;

(e) according to principles of the Newton optics, the controlled moving, periodicity, pulse, combined spectrum of the optical signal of the low energy level (ranging from 40-1000 lux equal to or smaller than equivalent solar light of 1%) such being obtained by the computer programmable pulsed scanning optical signal generator emitting optical signal with pulsed or pulsed periodical scanning combined spectrum;

(f) according to the principles of the Newton optics and the principles of thermal radiation, a temperature of 5~35° C., a humidity greater than 65%, the luminance of the light from the optical signal generator being about 40~1000 lux, so as to reduce the speed of the metabolism process and avoid the water to be evaporated from the body due to amount of the heat generated; the influence of the thermal interference on the fresh vegetables and fruits being minimized under low luminance of optical signal;

(g) according to the hypothesis that enhancement effect can be produced due to the overlapping of the blue and red optical signal with low energy level, during the photosynthesis of the fresh vegetables and fruits, there being difference of enhancement effect during the chloroplast absorbing the light quantum; and the enhancement effect generated by the combined optical signal being better than it generated by the monochrome optical signal, so as to obtain same effect using combined optical with low luminance and to impose lower influence on the fresh vegetables and fruits by the optical signal.

The advantages of the present invention are as follows:

slowly growing of the vegetables and fruits and extending the duration of the freshness under irradiating of the optical signal at the temperature of 5~35° C. and humidity greater than 65%;

lower energy consumption due to lower luminance of the artificial pulsed periodical scanning optical signal;

flexibility in controlling using computer programmable algorithm stored in the computer programmable controller and facility in production at factory and at home.

DETAILED DESCRIPTION OF THE INVENTION

The present invention will now be described in more detail in reference to the drawings.

EXAMPLE 1

Figure 1:
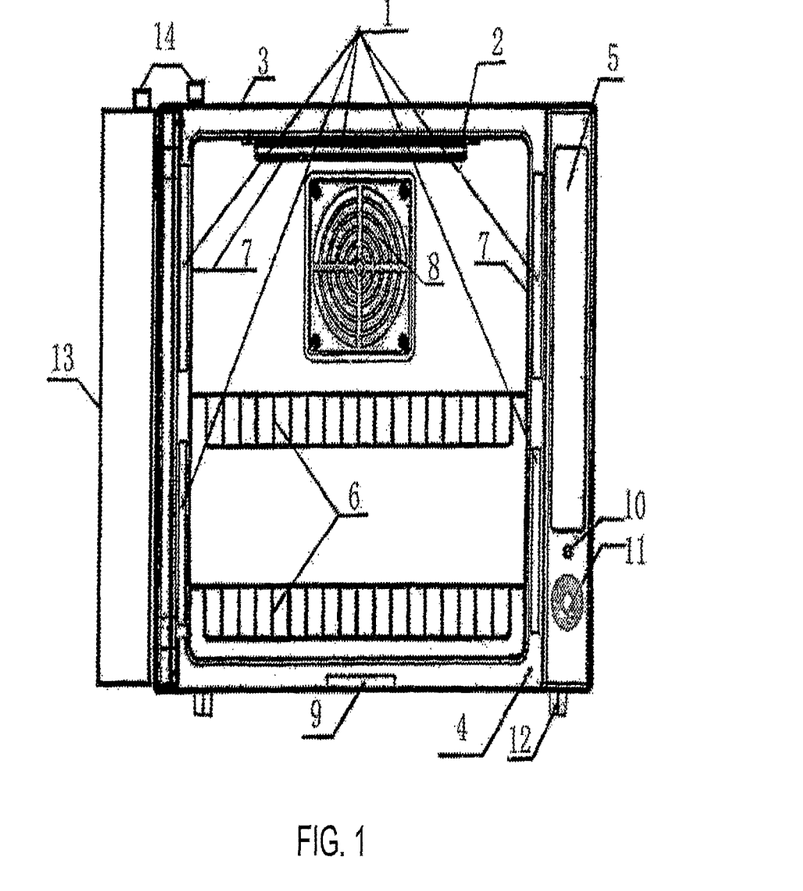
FIG. 1 is a diagrammatic view of an optical signal generator in form of cabinet structure according to one embodiment.

Referring to FIG. 1, the present invention includes a lighting plate structure 1, a main frame 2, an enclosure 3, a door 4, an internal electrical cabinet 5, a suspension device 6 for receiving the vegetables and fruits, a transparent isolation fence or a transparent isolation glass-plate 7 with protective effect, a ventilating fan and an air duct 8, a wind hole 9, an indication light 10, a power switch 11, a supporting leg or moving glidewheel 12, an automatic humidifying system 13, a humidifying tube interface 14, a computer programmable pulsed scanning signal generator 22, a red light source TRIAC controller 23, a green light source TRIAC controller 24, a blue light source TRIAC (tri-electrode AC switch) controller 25, a red light source group 26, a green light source group 27, and a blue light source group 28. The lighting plate structure 1 is composed of a red light source lighting plate, a green light source lighting plate and a blue light source lighting plate jointed together and is mounted inside the main frame 2 and the enclosure 3. The transparent isolation fence or the transparent isolation glass-plate 7 with protective effect is mounted on the surface of the lighting plate structure 1. The fan and an air duct 8 are mounted inside the enclosure 3. The wind hole 9 is disposed under the enclosure 3. The automatic humidifying system 13 and the humidifying tube interface 14 are mounted one side of the enclosure 3. The automatic humidifying system 13 has a moisture sensor mounted in the suspension device for receiving the vegetables and fruits and is communication with water inlet tube. The thermostat having a temperature sensor is connected to the ventilating fan.

EXAMPLE 2

Figure 2:
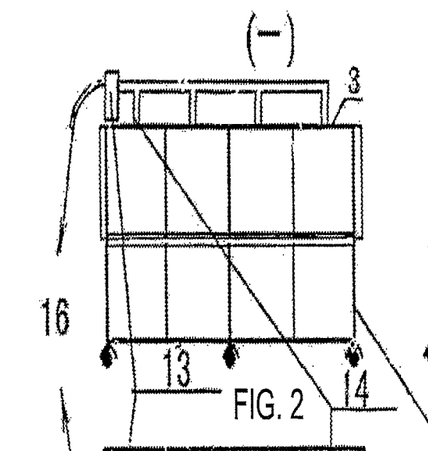
FIGS. 2-4 are diagrammatic views of an optical signal generator in form of cabinet structure with channels according to one embodiment.
Figure 3:
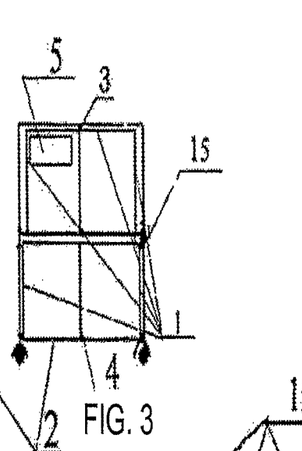
Figure 4:
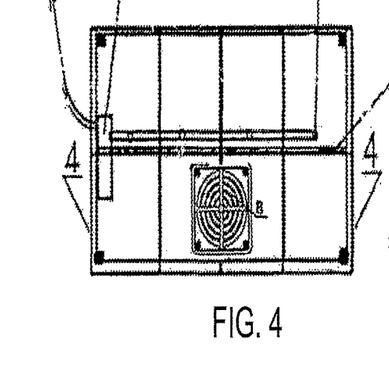
Figure 5:
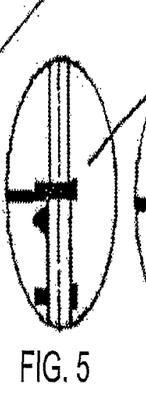
FIGS. 5-7 are diagrammatic views of an adjustable supporting rod in vertical direction according to one embodiment.
Figure 6:
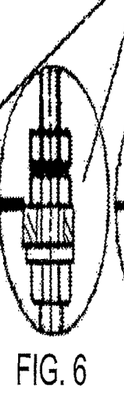
Figure 7:
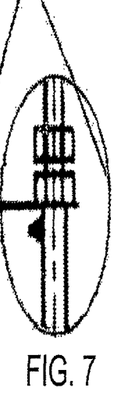

Referring to FIGS. 2-4, the structures are substantial same with that of FIG. 1. The lighting plate structure 1 is composed of a red light source lighting plate, a green light source lighting plate and a blue light source lighting plate jointed together and is mounted inside the main frame 2 and the enclosure 3. The fan and an air duct 8 are mounted inside the enclosure 3. The automatic humidifying system 13 and the humidifying tube interface 14 are mounted one side of the enclosure 13. The automatic humidifying system 13 has a moisture sensor mounted in the suspension device for receiving the vegetables and fruits and is communication with water inlet tube. The thermostat having a temperature sensor is connected to the ventilating fan. The main frame 2 is made in form of adjustable supporting rod in vertical direction, in particular, vertical lifting supporting adjustor of latch type (referring to FIG. 5), vertical lifting supporting-rack adjustor of screw type (referring to FIG. 6), or vertical lifting supporting adjustor of latch-screw type (referring to FIG. 7). The high of the vegetables and fruits placed in the receiving device can be adjusted by lifting supporting-rack adjustor via latch or screw. It can be disassembled or transported easily.

Figure 8:
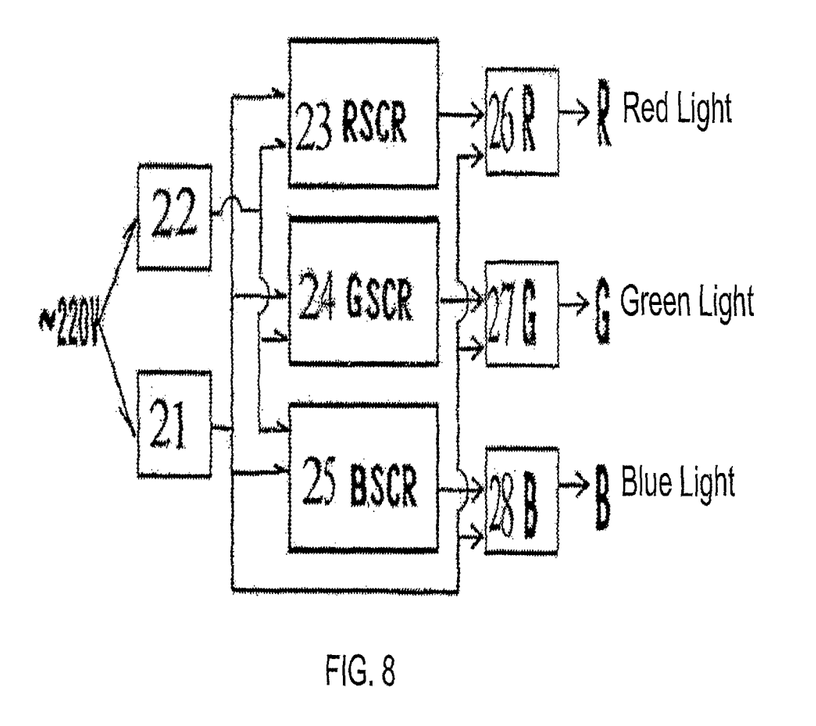
FIG. 8 is a block view illustrating a control circuit according to one embodiment.

In FIG. 8, the reference number 21 indicates an input power regulator which can adjust the alternating current with an input voltage of 0-220V and an output voltage of 0-220v; the reference number 22 indicates the computer programmable pulsed scanning signal generator; the reference 23 indicates the red light source TRIAC controller; the reference number 24 indicates the green light source TRIAC controller, the reference number 25 indicates the blue light source TRIAC controller. RSCR indicates interface for outputting red light source control signal; GSCR indicates interface for outputting green light source control signal, BSCR indicates interface for outputting blue light source control signal. The reference number 26 indicates a red light source group, the reference number 27 indicates a green light source group, and the reference number 28 indicates a blue light source group.

Figure 9:
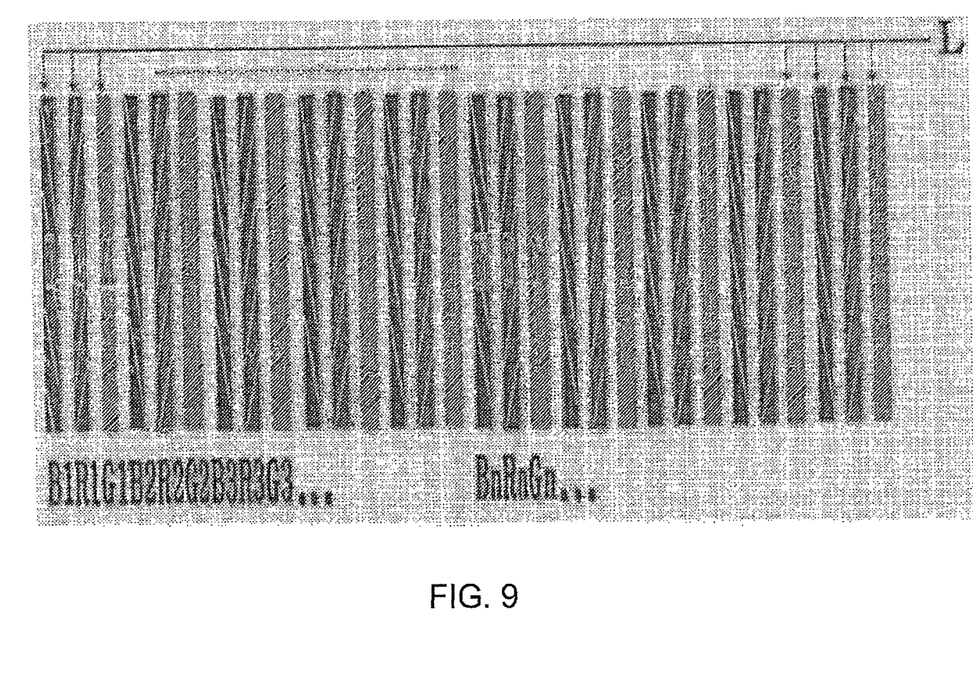
FIG. 9 is a diagrammatic view showing red, green and blue lighting plates according one embodiment.

In FIG. 9, the reference number L indicates link-aggregation interface connected to the computer programmable pulsed scanning signal generator 22; the reference number R1 indicates a first set light source emitting red light; the reference number Rn indicates a N'st set light source emitting red light; the reference number G1 indicates a first set light source emitting green light; the reference number Gn indicates a N'st set light source emitting green light; the reference number B1 indicates a first set light source emitting blue light; the reference number Bn indicates a N'st set light source emitting blue light.

Figure 10:
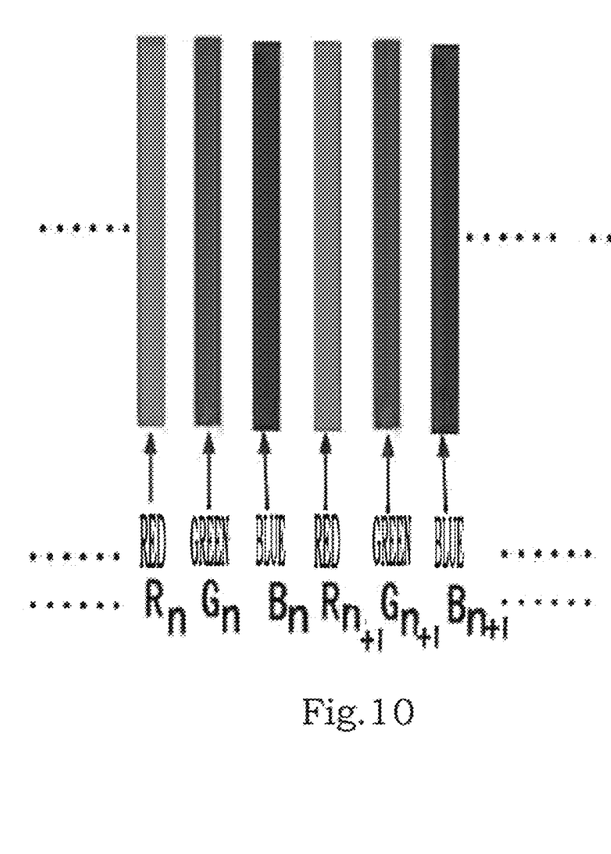
FIG. 10 is a plan view of red, green and blue light sources arranged in parallel according one embodiment.

In FIG. 10, the reference number Rn indicates a N'st set light source emitting red light; the reference number Gn indicates a N'st set light source emitting green light; the reference number Bn indicates a N'st set light source emitting blue light which are arranged (a) in parallel repeatly with a sequence of red, green, blue, red, green, and blue, or (b) in parallel repeatly with a sequence of red, blue, green, red, blue, and green.

Figure 11:
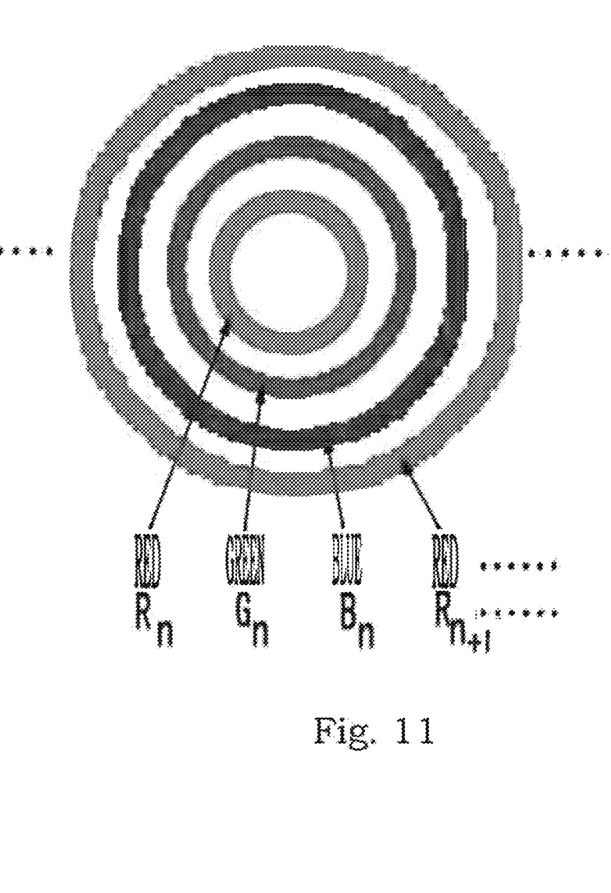
FIG. 11 is a plan view of red, green and blue light sources arranged on different concentric circle according one embodiment.

In FIG. 11, the reference number Rn indicates a N'st set light source emitting red light; the reference number G1 indicates a first set light source emitting green light; the reference number Bn indicates a N'st set light source emitting blue light which are arranged (a) in different concentric circles repeatly with a sequence of red, green, blue, red, green, and blue, or (b) in different concentric circles repeatly with a sequence of red, blue, green, red, blue, and green.

Figure 12:
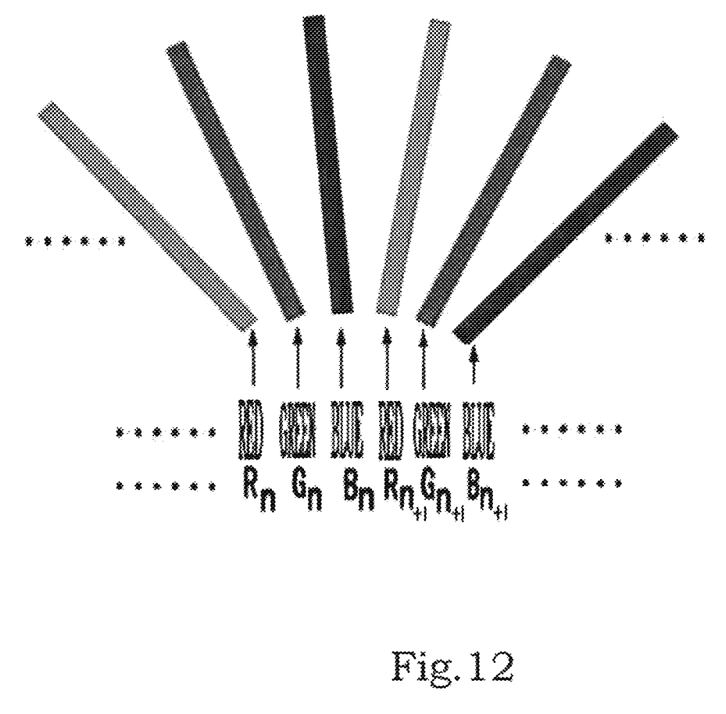
FIG. 12 is a plan view of green and blue light sources arranged radially according one embodiment.

In FIG. 12, the reference number Rn indicates a N'st set light source emitting red light; the reference number G1 indicates a first set light source emitting green light; the reference number Bn indicates a N'st set light source emitting blue light which are arranged (a) radially and repeatly with a sequence of red, green, blue, red, green, and blue, or (b) radially and repeatly with a sequence of red, blue, green, red, blue, and green.

As shown in FIGS. 1-12, the main frame 2 and enclosure 3 are formed a plurality of stainless steel plates welded together, or a plurality of tubes forms an vertical lifting adjustable supporting rod around which a plurality of stainless steel plates is mounted to formed a room. The lighting plate structure 1 composed of a red light source lighting plate, a green light source lighting plate and a blue light source lighting plate jointed together, is mounted inside the main frame 2. The lighting plate structure 1 is composed of a red light source lighting plate, a green light source lighting plate and a blue light source lighting plate jointed together repeatly with a sequence of red, green, blue, or red, blue, green. All of the poles of light sources are integrated into one side of each light plate, and are connected to corresponding interfaces of the TRIAC controllers 23, 24, 25. The TRIAC 23, 24, 25 are controlled by a pulsed scanning control switch signal outputted via the computer programmable pulsed scanning signal generator 22 such the corresponding red, green, blue light sources R, G, B in the device can generate regular pulsed periodical scanning signal with combined spectrum. The luminance parameters of the signal can be adjusted by the input power regulator. The scanning combined form according to example 1 is: the scanning sequences of the red light are as follows: (a) red light R1 is on and other red lights are off→red light R2 is on and other red lights are off→ . . . →red light Rn is on and other red lights are off; (b) red light R1 is on and other red lights are off→red lights R1, R2 are on and other red lights are off→ . . . →red lights R1, R2, . . . , Rn are on and other red lights are off→all red lights are on and all red lights are off, and then the program is run reversely and circularly. The program is suitable for green and blue lights. The scanning combined form according to example 2 is: blue light B1 is on and other red, green, blue lights are off→blue light B1, red light R1 are on, and other red, green, blue lights are off→blue light B1, red light R1, green light G1 are on, and other red, green, blue lights are off→ . . . →blue light Bn, red light Rn, green light Gn are on, and other red, green, blue lights are off, and then the program is run reversely and circularly. The scanning combined form according to example 3 is: blue light B1, red light R1, green light G1 are on, and other red, green, blue lights are off→blue light B1, red light R1, green light G1, blue light B2, red light R2, green light G2 are on, and other red, green, blue lights are off→ . . . →blue light Bn, red light Rn, green light Gn are on, and other red, green, blue lights are off, and then the program is run reversely and circularly. The scanning combined form according to example 4 is: blue light+red light, red light+green light, green light+blue light, blue light+red light→the scanning signal with a sequence above. The TRIAC 23, 24, 25 are controlled by a pulsed scanning control switch signal outputted via the computer programmable pulsed scanning signal generator 22 such that the red, green, blue light sources 26, 27, 28 in the device corresponding red, green, blue light sources R, G, B can generate regular pulsed periodical scanning signal with combined spectrum. All the lights are turned off after one periodical scanning to circle of bright reactive and dark reactive and this program is repeated. The vegetables and fruits are irradiated by the red light signal, the green light signal, the blue light signal and combined light signal emitting from the light sources R, G, B at room temperature of 5-35° C. and humidity of above 65% to maintain the freshness of them. Further, the automatic humidifying system and the humidifying tube interface are mounted one side of the enclosure. The automatic humidifying system has a moisture sensor mounted in the suspension device for receiving the vegetables and fruits and is communication with water inlet tube. The thermostat having a temperature sensor is connected to the ventilating fan. The system has a power supply with alternating current voltage of 220V. The input of the input power regulator is connected to the output of the power control switch with an input voltage of 0-220V and an output voltage of 0-220v. The parameters of the optical signal with pulsed spectrum are as follows: the luminance strengthens of the red, green, blue sources equal to or smaller than 1000 lux, the red light center wavelength of 660 nm, the green light center wavelength of 550 nm, the blue light center wavelength of 420 nm, pulse duty ratio of 50%, pulse width of 500 ms, scanning interval of 2 s, scanning circle of 10 s. The device further comprises a ventilating fan 8, humidometer and thermometer, automatic humidifying system 12, Leakage protection device, input power regulator 21.

EXAMPLE 3

The present invention can be implemented within a cold store, refrigerator or freezer, or within an independent space disposed in a cold store, refrigerator or freezer. The red, green, and blue light sources are fixed on a rectangle (or a square) isolation plate. In the device, lighting plate is mounted on the inner wall of the storage device for the vegetables and fruits. The fixed lighting plate in suspension state can emit light whose irradiating direction can not be adjusted, but the lighting plate with a rotation structure can adjust the irradiating direction of the light from light sources. All of the poles of light sources are integrated into one side of each light plate, and are connected to corresponding interfaces of the TRIAC controllers 23, 24, 25. The TRIAC 23, 24, 25 are controlled by a pulsed scanning control switch signal outputted via the computer programmable pulsed scanning signal generator 22 such the corresponding red, green, blue light sources R, G, B in the device can generate regular pulsed periodical scanning signal with combined spectrum. The principle of the electrical control and the temperature and humidity control in this embodiment is the same as that in the embodiments above mentioned.

Case Study 1

12 samples of lettuce are collected according to agricultural industry criteria NY/T428-2000 and NY 5193-2002, which are divided into four groups, each group containing 3 samples. The first group is placed in the storage device for the vegetables and fruits and subjected to irradiating of the optical signal (luminance of 400 lux); the second group is subjected to irradiating of the natural light or placed with a glass greenhouse; the third groups is placed with a dark room having a filament lamp disposed therein, and the fourth group is placed within a completely dark room. The four groups are all in the same environment with a temperature of 25° C. and a humidity of 85%, and are observed every 6 hours. It is found after 48 hours that: (a) the lettuces of the fourth group placed in the completely dark room become withered, yellow and rotten; (b) the lettuces of the third group placed within a room having a filament lamp (luminance equal to or more than 400 lux) become yellow and withered; (c) the lettuces of the second group subjected to natural light become yellow and withered; (d) the lettuces of the first group subjected to irradiating of the optical signal with pulsed spectrum periodical scanning remain fresh. The physical parameters in this case study includes a luminance strengthen of 400 lux, red wavelength of 660 nm, green wavelength of 550 nm, blue wavelength of 420 nm, pulse width of 500 ms, scanning interval time of 10 s and a scanning circle of 60 s.

Case Study 2

12 samples of lettuce are collected according to agricultural industry criteria NY/T428-2000 and NY 5193-2002, which are divided into four groups, each group containing 3 samples. The environment and physical parameters in this case study are substantial same as that in the case study 1. one group is place within a refrigerator at a temperature of 5° C. and a humidity of 85%. The four groups are observed every 6 hours. It is found after 168 hours that: the lettuces placed within the refrigerator become yellow and withered, but the lettuces subjected to irradiating of the optical signal with pulsed spectrum periodical scanning remain fresh.

Case Study 3

9 samples of areca catechu are collected according to agricultural industry criteria NY/T428-2000 and NY 5193-2002 which are divided into three groups, each group containing 3 samples. The parameters of the optical signal in this case study are the substantial same as that in the case study 1. (a) 3 samples of the areca catechus subjected to irradiating of the optical signal with pulsed spectrum periodical scanning remain fresh after 30 days; (b) 3 samples of the *areca catechus* at a room temperature of 25° C. become withered and rotten after 7 days; (c) 2 samples of the *areca catechus* placed within a refrigerator at a temperature of 5° C. and a humidity of 85% become withered and rotten.

Case Study 4

12 samples of oolong tea are collected according to agricultural industry criteria NY/T428-2000 and NY 5193-2002, which are divided into four groups, each group containing 3 samples. The first group is placed in a storage device for receiving the vegetables and fruits and subjected to irradiating of optical signal; the second group is subjected to irradiating of natural light with luminance of 400 lux; and the third group is placed within a refrigerator at a temperature of 5° C. and a humidity of 85%. It is found after 72 hours that: the oolong tea of the first group remains fresh; the oolong tea of the second group becomes withered and rotten; and the oolong tea of the third group becomes withered and rotten.

The fact that the present invention can extend the duration of the freshness of the vegetables and fruits at room temperature with lower energy consumption can be verified base on the case studies mentioned above.

It should be understood that various example embodiments have been described with reference to the accompanying drawings in which only some example embodiments are shown. The present invention, however, may be embodied in many alternate forms and should not be construed as limited to only the example embodiments set forth herein.

What is claimed is:

1. An optical signal generator for maintaining freshness of vegetables or fruits and in the form of a cabinet structure, comprising:
   an enclosure (3);
   a main frame (2) disposed in the enclosure (3);
   a lighting plate structure (1) mounted inside the main frame (2) and the enclosure (3),
   a door (4) and a receiving device (6) for receiving vegetables or fruits to be placed within the enclosure (3),
   a transparent isolation fence or glass-plate (7) mounted on the surface of the lighting plate structure (1);
   a fan and an air duct (8) mounted inside the enclosure (3);
   a wind hole (9) disposed on a bottom side of the enclosure (3); and
   an automatic humidifying system (13) with a humidifying tube interface (14) mounted on a side of the enclosure (13),
   wherein the lighting plate structure (1) comprises:
      a computer programmable pulsed scanning signal generator (22),
      a red light source group (26), a green light source group (27), and a blue light source group (28), and
      a red light source TRIAC controller (23), a green light source TRIAC controller (24), and a blue light source TRIAC controller (25), each of which is connected to and is configured to receive a pulse from the computer programmable pulsed scanning signal generator (22) and thereby correspondingly controls the red light source group (26), the green light source group (27), and the blue light source group (28) to emit light signals, with a pulsed or pulsed periodical scanning combined spectrum, to the vegetables or fruits to maintain freshness of the vegetables or fruits.

2. The optional signal generator of claim 1, wherein the emitted light signal has a luminance of 40-1000 Lux.

3. The optical signal generator of claim 1, wherein the red light source group (26), the green light source group (27), and the blue light source group (28) each comprises single-linear or multi-linear lighting tubes, single-point or multi-point lighting lamps, or single-point or multi-point LED, or light emitter made of rare earth material with lower energy consumption.

4. The optical signal generator of claim 1, wherein the red light source group (26), the green light source group (27), and the blue light source group (28) are arranged in parallel and apart from each other.

5. The optical signal generator of claim 1, wherein the red light source group (26), the green light source group (27), and the blue light source group (28) are arranged on different concentric circles.

6. The optical signal generator of claim 1, wherein the red light source group (26), the green light source group (27), and the blue light source group (28) are arranged radially.

7. An optical signal generator for maintaining freshness of vegetables or fruits and in the form of a cabinet structure having channels, comprising:
   an enclosure (3);
   a main frame (2) disposed in the enclosure (3);
   a lighting plate structure (1) mounted inside the main frame (2) and the enclosure (3), wherein the lighting plate structure is made in the form of an adjustable supporting rod in a vertical direction in the enclosure (3);
   a fan and an air duct (8) mounted inside the enclosure (3); and
   an automatic humidifying system (13) with a humidifying tube interface (14) mounted on a top side of the enclosure (13), the automatic humidifying system (13) being in communication with a water inlet tube (16),
   wherein the lighting plate structure (1) comprises:
      a computer programmable pulsed scanning signal generator (22),
      a red light source group (26), a green light source group (27), and a blue light source group (28), and
      a red light source TRIAC controller (23), a green light source TRIAC controller (24), and a blue light source TRIAC controller (25), each of which is connected to and is configured to receive a pulse from the computer programmable pulsed scanning signal generator (22) and thereby correspondingly controls the red light source group (26), the green light source group (27), and the blue light source group (28) to emit light signals, with a pulsed or pulsed periodical scanning combined spectrum, to the vegetables or fruits to maintain freshness of the vegetables or fruits.

* * * * *